UNITED STATES PATENT OFFICE.

SYLVAIN BLUM, OF GALVESTON, TEXAS, ASSIGNOR OF THREE-FOURTHS TO HILLIARY ELDRIDGE AND DANIEL J. CLARK, OF SAME PLACE, AND SAM LAZARUS, OF SHERMAN, TEXAS.

COMPOSITION OF MATTER FOR MANUFACTURING CALCIUM CARBID.

SPECIFICATION forming part of Letters Patent No. 589,592, dated September 7, 1897.

Application filed February 3, 1897. Serial No. 621,851. (No specimens.)

*To all whom it may concern:*

Be it known that I, SYLVAIN BLUM, a citizen of the United States, residing at Galveston, in the county of Galveston and State of Texas, have invented a new and useful Composition of Matter for Manufacturing Calcium Carbid, of which the following is a specification.

This invention relates to the manufacture of calcium carbid and contemplates the provision of a new and useful composition of matter to facilitate the production of this chemical.

The invention therefore has for its main and primary object to provide a new and useful composition of matter that will effect the very rapid reduction and combination of the ingredients thereof to form calcium carbid on a commercially successful basis.

With this object in view the invention consists in a composition of matter composed of twenty-two bushels of air-slaked lime, eight bushels of pulverized carbon, four bushels of pulverized plumbago containing iron, and one-half bushel of pulverized potash.

The several ingredients, preferably in the proportions specified, are thoroughly mixed together and exposed to the fusing action of the electric-arc heat in an ordinary electric furnace, and the resultant compound, from the action of the electric furnace on the several ingredients, is the commercial calcium carbid.

It is important to the successful carrying out of the present invention that the ingredients plumbago and potash be used in connection with the air-slaked lime and carbon, and it is to be observed that the plumbago is selected as an ingredient because the same is usually intimately associated with iron. The iron associated with the carbon of the plumbago acts as a flux in facilitating the union of the carbon with the calcium, while the potash or carbonate of potassium also acts as a flux and enters into the carbid product, taking up its proportion of carbon, so that the entire carbid product will have a trace of potash. Owing to the fluxing qualities of the plumbago and potash the reduction of the several ingredients of the carbid product under the electric heat is very rapid, so that the production of the calcium carbid can be carried out on a very economical basis.

While the several ingredients have the action referred to, still the precise manner in which the results stated are accomplished is not known sufficiently to be technically explained by chemical reactions.

Having thus described the invention, what is claimed, and desired to be secured by Letters Patent, is—

A compound for the manufacture of calcium carbid composed of air-slaked lime, carbon, plumbago containing iron, and potash, substantially as described.

In testimony that I claim the foregoing as my own I have hereto affixed my signature in the presence of two witnesses.

SYLVAIN BLUM.

Witnesses:
H. RINKER,
M. BURNS.